Nov. 29, 1955 W. F. BORGERD 2,725,117
AUTOMATIC AIR FILTER CLEANING APPARATUS
Filed Nov. 2, 1953 2 Sheets-Sheet 1

INVENTOR.
WILLIAM F. BORGERD

ATTY.

INVENTOR.
WILLIAM F. BORGERD

ATTY.

United States Patent Office 2,725,117
Patented Nov. 29, 1955

2,725,117

AUTOMATIC AIR FILTER CLEANING APPARATUS

William F. Borgerd, Evansville, Ind., assignor to International Harvester Company, a corporation of New Jersey Application November 2, 1953, Serial No. 389,689

10 Claims. (Cl. 183—52)

This invention relates generally to air conditioning systems, and more specifically to an improved system for automatically cleaning air conditioner air filters.

As is well-known in the art, a very important phase of air conditioning is the cleaning of air. This is generally accomplished through use of various types of filters mounted in cooperation with the air conditioning equipment. Generally, the air filters can be cleaned by causing a spray of water to be directed through them. Recently, a number of air filters have been produced commercially of certain plastic materials which exhibit excellent properties of natural electrostatic attraction because of their high electrical surface resistance. These filters are usually very easily washed by a spray of water, since the wetting of the fibers of the air filter reduces the electrical resistance thereof and thus temporarily removes the natural electrostatic attraction of the fibers. The dust and dirt particles on the fibers may then easily flow therefrom with the water to produce a clean filter. Once these filters are dry the natural electrostatic attraction will return, and normal filtering action will again occur. Since these air filters are often mounted within relatively inaccessible portions of the air conditioning equipment, their removal is often times cumbersome and time consuming, it is therefore the object of this invention to produce an automatic air filter cleaning system which will not require the removal of the filter from the air conditioning equipment, and which will not require any attention by the user of the air conditioning equipment.

A feature of the present invention is the novel combination of a water spray system, an air filter cleanliness indicating device, and a control circuit.

Other objects and features of the present invention will be apparent upon a perusal of the following specification and drawings of which:

The present embodiment is the preferred embodiment but it is to be understood that changes can be made in the present embodiment by one skilled in the art without departing from the spirit and scope of this invention.

Figure 1:
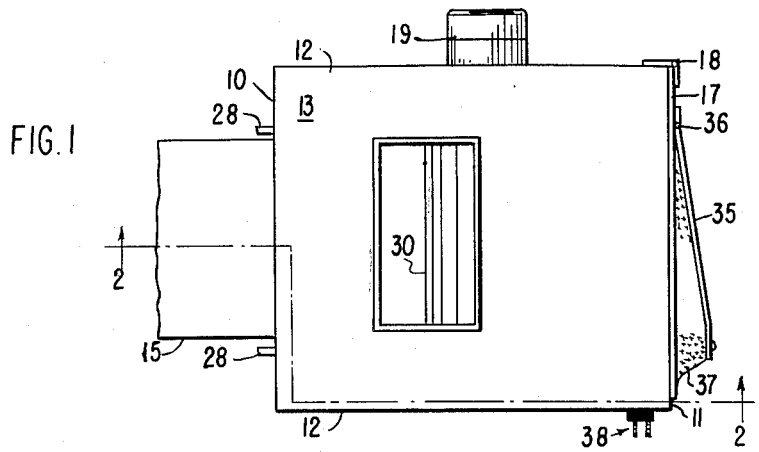
Figure 1 is a plan view of an air conditioning system embodying the present invention.
Figure 2:
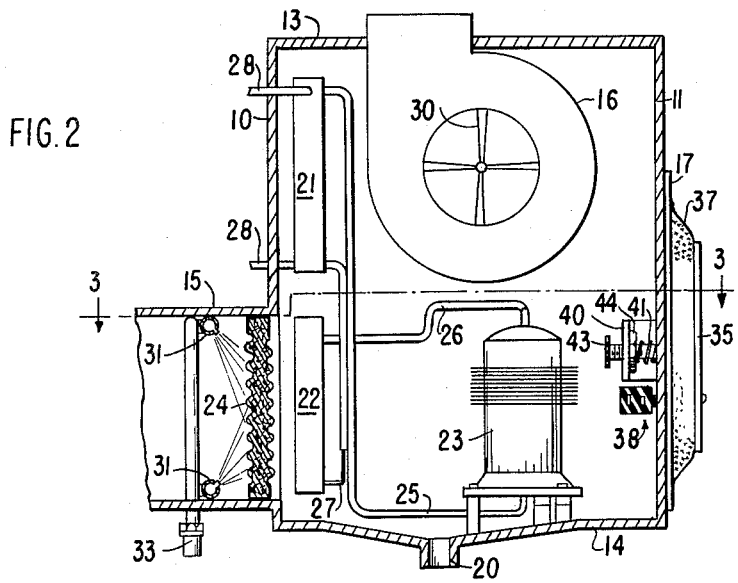
Figure 2 is a vertical sectional view of the equipment shown in Figure 1 and taken along the line 2—2.
Figure 3:
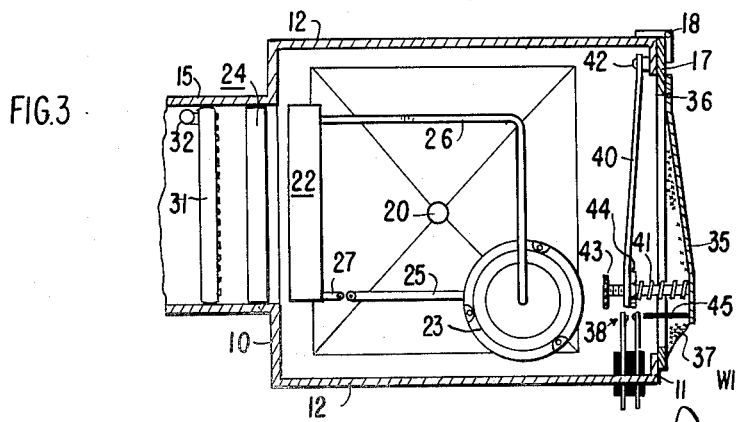
Figure 3 is a horizontal sectional view of the equipment shown in Figures 1 and 2 and taken along the line 3—3 of Figure 2; and, Figure 4 is a partially diagrammatic view of the control circuit for the present invention.

To describe the invention in detail, reference is first made to Figures 1 through 3. A substantially airtight cabinet having a front wall 10, a rear wall 11, two side walls 12, a top wall 13 and a bottom wall 14 is provided for containing the air conditioning equipment. A number of openings are provided through various walls of the cabinet. An opening is provided through the front wall 10 and over this opening an intake duct 15 is mounted. An opening is provided through the top wall 13, and a blower type fan 16 having a blower 30 is mounted within the cabinet by any means well-known in the art with the outlet thereof projecting through the opening in the top wall 13, as can easily be seen in Figure 2. An exhaust duct (not shown) is connected over the outlet of the fan 16, and that exhaust duct and the intake duct 15 are connected to the space to be air-conditioned as is well-known in the art. A service opening is provided through the rear wall 11, and a door 17 is pivotally mounted by means of hinge means 18 over the service opening. A further opening is provided for the motor 19 through one of the side walls 12. The motor 19 is operatively connected by any means well-known in the art to the blower 30 of the blower type fan 16 through the opening provided therefor in one of the side walls 12. The only other opening in the cabinet of any importance is the drain pipe 20 mounted through the bottom wall 14 at the center of the sloping surfaces thereof so that any water collecting within the cabinet will drain to and through the drain pipe 20. The diameter of the drain pipe 20 is such as to cause no appreciable change in the air pressure existing within the cabinet at any one time due to the operation of the equipment therein.

The equipment within the air conditioning cabinet mainly comprises two heat exchange units 21 and 22, a motor-compressor unit 23, an air filter 24, and means for automatically cleaning the air filter 24 when it is dirty. In the present embodiment the two heat exchange units 21 and 22 are shown as two distinct types. The heat exchange unit 21 is of the liquid-to-liquid type, and the heat exchange unit 22 is of the air-to-liquid type. The motor-compressor unit 23 may be of any type well-known in the art. The motor-compressor unit 23 is provided with an outlet or exhaust tube 25 and an inlet or suction tube 26. The exhaust tube 25 is connected to the liquid-to-liquid heat exchange unit 21. The other end of the liquid-to-liquid heat exchange unit 21 is connected by means of a length of tubing and a metering device 27 to the air-to-liquid heat exchange unit 22. The other end of the air-to-liquid heat exchange unit 22 is connected to the suction line 26 of the motor-compressor unit 23. This described system is charged with a suitable refrigerant such as one of the Freons. In this described arrangement, the liquid-to-liquid heat exchange unit 21 would act as a conventional condenser, and the air-to-liquid heat exchange unit 22 would function as a conventional evaporator. Therefore, any cooling liquid well-known in the art would be circulated through the condenser 21 through the lengths of tubing 28. Reversing valve means (not shown) could be provided for reversing the flow of the refrigerant to reverse the functions of the heat exchange units 21 and 22, so that the heat exchange unit 21 would function as a conventional evaporator and the heat exchange unit 22 would function as a conventional condenser.

The operation of the air conditioning system shown in this embodiment may be described as follows: The motor-compressor unit 23 discharges hot compressed gaseous refrigerant into tube 25; the refrigerant then passes into the heat exchange unit 21 and is cooled and condensed to a liquid therein; the liquid refrigerant is then metered through metering means 27 into the heat exchange unit 22; the blower type fan 16 is operated by the motor 19 to draw air from the space to be conditioned into the duct 15, through the filter 24, through heat exchange unit 22 into the blower wheel 30 and out of the blower type fan 16, the air passing through the air filter 24 is filtered by the air filter 24 and the air is then passed through the heat exchange unit 22 to be cooled thereby, the air passing through the heat exchange unit 22 is cooled; the refrigerant within the heat exchange unit 22 will be heated to a gaseous state and the gaseous refrigerant formed within the heat exchange unit 22 will be drawn through the tubing 26 into the suction line of the motor-compressor unit 23.

The air filter 24 is of the type previously described wherein a mass of fibers, having the property of allowing a relatively free passage of air therethrough while catching dust and dirt particles from that air, is mounted between two screens.

Turning next to a detailed description of the automatically operated means for cleaning the air filter 24, reference is made to Figures 1 through 4. A pair of water spray headers 31 are mounted within the intake duct 15 on the air inlet side of the air filter 24, as can easily be seen in Figure 2. One of the headers 31 is mounted at the top of the intake duct 15, and the other of the headers 31 is mounted at the bottom of the intake duct 15 transversely to the length thereof. As is well-known in the art, each of these water spray headers 31 comprises a longitudinal tube, closed at one end, having a series of small nozzles disposed longitudinally therealong. The headers 31 are positioned so that water pumped into the headers 31 will be forced from the nozzles in a direction toward and completely covering the air inlet side of the air filter 24. A water supply tube 32 is provided for the headers 31 and is connected to the open end of each of said headers. The water supply tube 32 is in turn connected to a water supply line 33.

The service door 17, pivotally mounted to the rear wall 11, is provided with an opening therethrough, and a second or auxiliary door 35 is pivotally mounted over the opening in the service door 17 by means of the mounting means 36. The marginal edges of the second door 35 are sealed to a bellows 37. The bellows 37 may be of any type well-known in the art such as a rubberized fabric. The bellows 37 is in turn sealed over the opening in the service door 17, as can easily be seen in Figures 1, 2, and 3. The door 35 is biased to the maximum open position by a pair of springs 40 and 41. The spring 40 is a leaf spring and is mounted at one end thereof to the inner surface of the rear wall 11 by means of mounting means 42. A screw 43 is threaded through the other end of the leaf spring 40. A nut 44 is threaded onto the screw 43, and the spring 41 which is a coiled spring, is mounted about the shaft of the screw 43 and projects against the nut 44 and the inner surface of the door 35. The screw 43 may be threaded further through the leaf spring to increase the tension thereof, and the nut 44 can be turned on the shaft of the screw 43 to adjust the tension of the coiled spring 41. An electrically insulated arm 45 is mounted to the inner surface of the door 35 as can easily be seen in Figure 3. A pair of contacts 38 are mounted within an insulator which in turn is mounted within one side wall 12 of the cabinet as can easily be seen in Figures 1 through 3. The contacts 38 are normally open and are closed by the projection of the end of the arm 45 thereagainst. To operate the arm 45 to close the contacts 38, the door 35 can be manually pushed to the closed position, or the air pressure within the cabinet can be reduced to cause the air pressure without the cabinet to move the door 35 to the closed position. When the air filter 24 is clean and the blower fan 16 is operating, there wil be a slight negative pressure within the cabinet due to the resistance of the duct 15, the clean air filter 24 and the heat exchange unit 22. However, as the air filter 24 catches and retains more and more of the dust and dirt particles from the air passing through the intake duct 15, the resistance of the air filter 24 to the air passing through the duct 15 will increase, and this will cause a corresponding increase in the negative pressure within the cabinet. The bias of the springs 40 and 41 are so adjusted that when the air filter 24 is in a condition to require cleaning thereof, the pressure differential between the interior and the exterior of the cabinet will cause the door 35 to close, in turn causing the arm 45 to close the contacts 38. Although the present embodiment is shown as utilizing an increasing negative pressure to indicate the cleanliness condition of the air filter, an increasing positive pressure could also be used if the air filter is mounted within the exhaust duct. Further, the second door could be mounted on other cabinet surfaces.

To supply water to the water supply line 33 for the cleaning of the air filter 24, a solenoid operated water valve 50 connected to a source of water is provided. The solenoid operated valve 50 comprises an inlet port 51 and an outlet port 52. The inlet port 51 is connected to a length of tubing 53 which in turn is connected to a source of water under pressure. The outlet port 52 is connected to the water supply line 33 as can easily be seen in Figure 4. The solenoid operated valve 50 is shown in section to facilitate the description thereof. A valve shaft 54 is slidably mounted within the body of the solenoid valve 50. A valve seat 55 is provided in the valve 50, and a valve head 56 is mounted to the valve shaft 54 to cooperate with the valve seat 55 for opening and closing the source of water to the water supply line 33. A solenoid plunger 57 is mounted about the valve shaft 54 of the valve 50, and a coiled spring 58 is also mounted about the valve shaft 54 and projects against the valve body and the solenoid plunger 57 to bias the valve head 56 against the valve seat 55 to normally maintain the valve 50 in the closed position. A solenoid coil 59 is disposed about the body of the solenoid valve 50. When the solenoid coil 59 is energized, current flowing through the coil will cause a magnetic attraction of the solenoid plunger 57 and the solenoid plunger 57 will move into the solenoid coil 59 to cause the valve head 56 to be moved from the valve seat 55 to thereby allow water to flow to the headers 31. A solenoid switch 60 is mounted to cooperate with the solenoid valve 50.

The solenoid switch 60 (shown diagrammatically) comprises a solenoid coil 61 and a solenoid plunger 62. An armature 63 is mounted to the solenoid plunger 62 so that when the solenoid coil 61 is energized, the solenoid plunger 62 is moved to cause the armature 63 to interconnect contacts 64 and 65. The solenoid switch 60 is normally energized by a thermostat 66 mounted in conjunction with the space to be air-conditioned. The solenoid plunger 62 is so mounted in cooperation with the solenoid shaft 54 that the operation of the solenoid valve 50 will cause the shaft 54 to be projected against the end of the solenoid plunger 62 to move the plunger 62 to cause the armature 63 to break the connection between contacts 64 and 65. The disconnecting of contacts 64 and 65, whenever the solenoid valve 50 is operated, causes the operating circuit for the motor-compressor unit 23 and blower fan motor 19 to be broken.

Figure 4:
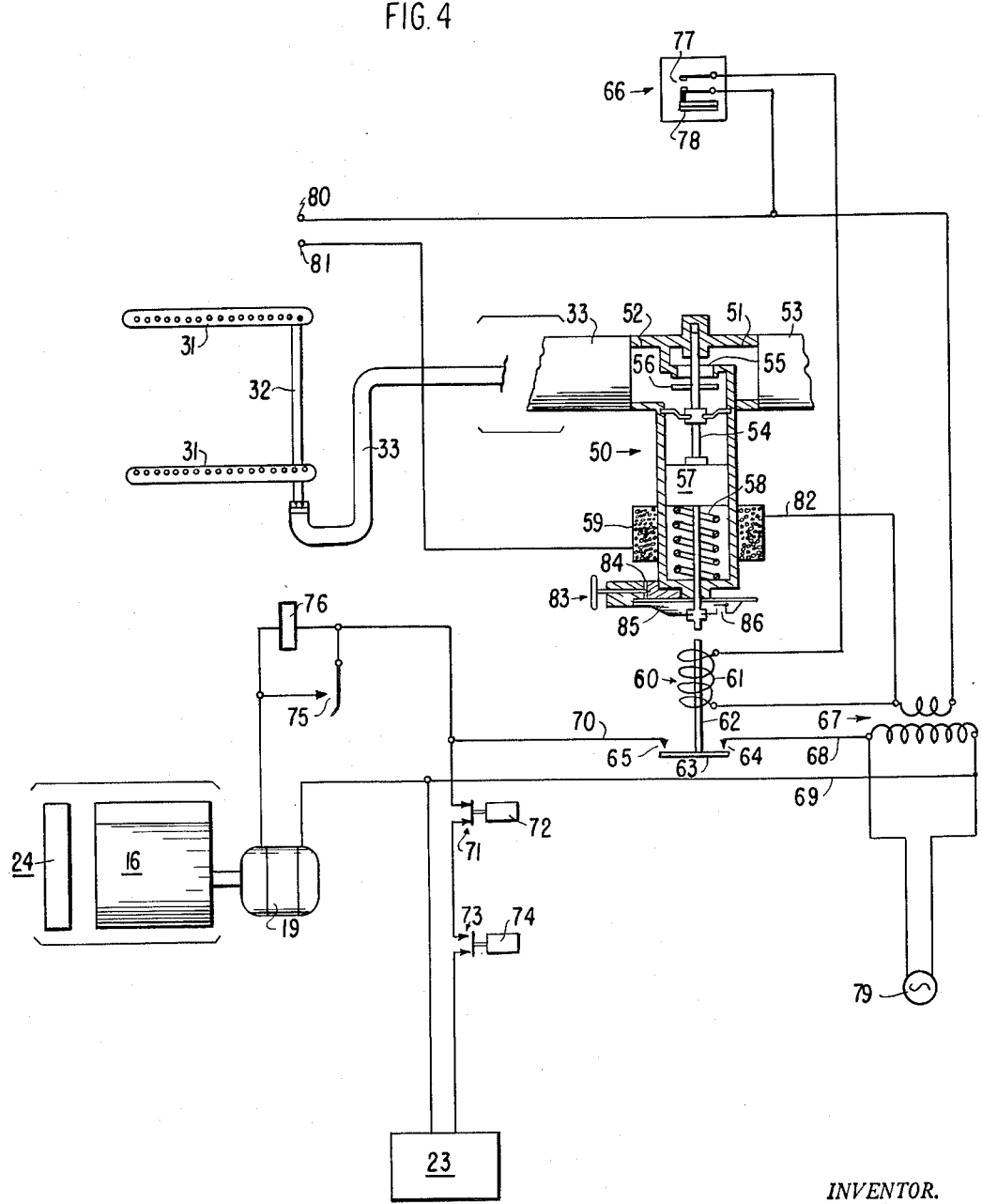

To describe the operating circuits for the motor-compressor unit 23 and the blower fan motor 19, reference is made to Figure 4. A power transformer 67 is provided and connected to a power source 79. Conductors 68 and 69 are bridged across the primary of the power transformer 67. Conductor 68 is also connected to contact 64, and conductor 69 is also connected in parallel to one side of the blower fan motor 19 and the motor-compressor unit 23. Contact 65 is connected to the other side of the motor-compressor unit 23 through conductor 70, contacts 71 of the high pressure cutout 72, and contacts 73 of the thermal overload protector 74. Contact 65 is also connected to the other side of the blower fan motor 19 through conductor 70, and the contacts 75 of the time delay relay 76 when the contacts 75 are closed. The functions of the high pressure cutout 72, the thermal overload protector 74, and the time delay relay 76 are well-known in the art. It is sufficient to note that the high pressure cutout is mounted in cooperation with the high pressure side of the motor-compressor unit 23 and will operate to open contacts 71 to break the operating circuit for the motor-compressor unit 23 when the high pressure side of the motor-compressor unit 23 rises above a certain predetermined value. Further, the thermal overload protector 75 is mounted in cooperation with the motor-compressor unit 23 so that the thermal overload protector 74 will operate to open the contacts 73 to break the operating circuit for the motor-compressor unit 23 when the motor-compressor unit 23 rises in temperature above a certain predetermined value. And lastly, the time delay relay 76 is connected across the contacts 75, so that the time delay relay 76 is energized when the operating circuit for the motor-compressor unit 23 is closed. A short interval thereafter, approximately half a minute, the time delay relay 76 will operate to close its contacts 75 to permit the operation of the blower fan motor 19. This is done in order to allow the motor-compressor unit 23 to initially adjust the temperatures and pressures of the system before the blower fan motor 19 begins to operate. To control the operation of the motor-compressor unit 23 and the blower fan motor 19, the thermostat 66 is provided. As mentioned previously, the thermostat 66 is mounted in cooperation with the space to be air-conditioned. The thermostat 66 comprises a pair of contacts 77 and a bimetallic strip 78. When the space to be air-conditioned requires air conditioning, the bimetallic strip 78 will bend to close contacts 77. Contacts 77 are connected directly to one side of the secondary of the power transformer 67, and to the other side of the secondary of the power transformer 67 through the solenoid switch coil 61. Thus, when the space to be air-conditioned requires air conditioning the thermostat 67 will operate to complete a circuit for the energization of the solenoid switch coil 61. The solenoid switch coil 61 will then cause the solenoid plunger 62 to be moved to interconnect contacts 64 and 65. The interconnection of contacts 64 and 65 will complete the previously described circuits for the operation of the blower fan motor 19 and the motor-compressor unit 23 across the primary of the power transformer 67. The contacts 38 which have been previously described as mounted within the cabinet and cooperating with the arm 45 mounted to the door 35, are connected to the conductors 80 and 81. Conductor 21 is connected to one side of the solenoid valve coil 59, and conductor 80 is connected to one side of the secondary of the power transformer 67. The other side of the solenoid valve coil 59 is connected to the other side of the secondary of the power transformer 67 by means of conductor 82. Thus, it can be seen that when contacts 38 are closed a circuit is completed for the energization of the solenoid valve coil 59, and as previously described, the solenoid valve 60 will be operated to cause water to be delivered to the water spray headers 31. Since the contacts 38 are closed when a certain pressure differential is attained between the interior and and the exterior of the cabinet, and since the operation of the solenoid valve 50 causes the operating circuits for the blower fan 19 and the motor-compressor unit 23 to be broken, the consequent stopping of the blower fan 16 will cause a loss of the pressure differential between the interior and the exterior of the cabinet. The pressure equalization will permit the door 35 to be moved to the open position under the bias of the springs 40 and 41, again opening contacts 38. This causes the operating circuit for the solenoid valve 50 to be broken. The breaking of the operating circuit for the solenoid valve 50 permits a restoration of the operating circuit for the blower fan 16. Thus, it can be seen that the equipment would merely cycle and recycle and thus prevent an efficient cleaning of the air filter 24. To prevent this rapid cycling and recycling, a bleeder valve 83 is provided. The bleeder valve 83 comprises an adjustable needle valve 84, a bellows 85, and an intake valve 86. The bellows 85 is mounted to the solenoid valve shaft 54, so that when the solenoid valve 50 is operated, the bellows 85 is expanded. The expansion of the bellows 85 opens the valve 86 to permit the entrance of air into the bleeder valve 83. When the solenoid valve 50 is de-energized, the cushion of air within the bleeder valve 83 prevents a rapid restoration to normal of the solenoid valve 50. The needle valve 84 permits a relatively slow bleeding of the air from the bellows 85 of the bleeder valve 83, and the length of time required to bleed the air from the bleeder valve 83 is adjusted to equal the time necessary to completely clean the air filter 24 by means of the water spray headers 31.

To describe the detailed operation of the instant invention reference is made to Figures 1 through 4. As previously described, after a period of use the air filter 24 will become substantially lodged with dust and dirt particles, thereby causing a substantial pressure differential between the interior and the exterior of the air conditioning cabinet. The pressure differential will move the door 35 until the arm 45 causes the contacts 38 to be closed. When contacts 38 are closed, the solenoid valve 50 is operated through the previously described circuits, the bleeder valve 83 is filled with air through the valve 86, and the operating circuits for the blower fan 16 and the motor-compressor unit 23 are disabled through the disconnecting of the contacts 64 and 65 of the solenoid switch 60. The operation of the solenoid valve 50 and the gradual restoration thereof, permits water to flow from the pipe 53, through the valve 50, through the water supply line 33 to the water spray headers 31. The water will be sprayed from the headers 31 against and through the air filter 24. The water flowing to and through the air filter 24 will wash the dust and dirt particles therefrom as previously described, and the mixture of dust and dirt particles and water will flow from the air filter 24 to and through the drain pipe 20. After the time necessary for the bleeder valve 83 to restore the solenoid valve 50, the solenoid valve 50 will be closed to stop the flow of water through the water spray headers 31. The solenoid switch 60 may then operate in conjunction with the thermostat 66 to cause normal operation of the air conditioning system until cleaning of the air filter 24 is again required. It may be noted that when the air filter 24 is clean or only partially dirty, the pressure differential between the interior and the exterior of the cabinet is insufficient to cause the door 35 to be moved against the bias of springs 40 and 41 to cause the closing of contacts 38 and the subsequent operation of the solenoid valve 50. If it is found that for any specific type of filter the time of restoration of the solenoid valve 50 must be changed, the needle valve 84 is adjusted to permit a more rapid or a slower restoration of the solenoid valve 50.

Having described the invention what is considered new and desired to be protected by Letters Patent is:

1. In an air conditioning system, an air filter, water spray means operating responsive to the reception of water thereto for washing said air filter, means including a solenoid valve for delivering water to said water spray means responsive to the operation of the solenoid of said solenoid valve, an electrical circuit including a power source and the solenoid of said solenoid valve and a switch, said switch formed to complete said circuit for the operation of said solenoid when said switch is closed, means operable to close said switch, said last-mentioned means operating responsive to a certain predetermined resistance of said air filter to air passing therethrough.

2. In an air conditioning system, an air filter, a water spray header mounted within said air conditioning system and positioned to cooperate with said air filter whereby water delivered to said water spray header will flow from said header to wash said air filter, means including a solenoid valve for delivering water to said water spray header, an electrical circuit including a power source and the solenoid of said solenoid valve and a switch, said switch formed to complete said circuit for the operation of said solenoid when said switch is closed, means operable to close said switch, said last-mentioned means operating responsive to a certain predetermined resistance of said air filter to air passing therethrough.

3. In an air conditioning system, a substantially airtight cabinet, an intake duct and an exhaust opening provided through the walls of said cabinet, an air filter mounted within said intake duct, means within said cabinet operable to draw air into said intake duct through said air filter and to expel said air from said exhaust opening at certain air pressures in said cabinet, water spray means operating responsive to the reception of water thereto for washing said air filter, means including a solenoid valve for delivering water to said water spray means responsive to the operation of the solenoid of said solenoid valve, an electrical circuit including a power source and the solenoid of said solenoid valve and a switch, said switch formed to complete said circuit for the operation of said solenoid when said switch is closed, means operable to close said switch, said last-mentioned means operating responsive to an air pressure within said cabinet some amount below said certain air pressures.

4. In an air conditioning system, a substantially airtight cabinet, an intake duct and an exhaust duct provided through the walls of said cabinet, an air filter mounted within said intake duct, means within said cabinet operable to draw air into said intake duct through said air filter and to expel said air from said exhaust duct at certain negative air pressures within said cabinet, water spray means operable to wash said air filter, means operating responsive to an air pressure within said cabinet some amount below said certain air pressures for operating said water spray means, said last-mentioned means comprising an opening through one wall of said cabinet, a door pivotally mounted over said opening, a bellows mounted about the marginal edges of said door in a sealed relationship thereto, said bellows further mounted in a sealed relationship about the edges of said opening, biasing means for biasing said door to the open position, whereby said door is moved toward the closed position amounts proportional to said certain negative air pressures in said cabinet, and means operating responsive to the closing of said door to a position representing some amount of pressure within said cabinet below said certain air pressures for operating said water spray means.

5. In an air conditioning system, thermostatically operated means for controlling the operation of said air conditioning system, an air filter, water-spray means operating responsive to the reception of water thereto for washing said air filter, means including a solenoid valve for delivering water to said water-spray means responsive to the operation of said solenoid valve, means operating to disable said thermostatically operated means responsive to the operation of said solenoid valve, an electrical circuit including a power source and the solenoid of said solenoid valve and a switch, said switch formed to complete said circuit for the operation of said solenoid when said switch is closed, means operable to close said switch, said last mentioned means operating responsive to a predetermined resistance of said air filter to air passing therethrough.

6. In an air conditioning system, thermostatically operated means for controlling the operation of said air conditioning system, an air filter, a water spray header mounted within said air conditioning system and positioned to cooperate with said air filter whereby water delivered to said water spray header will flow from said header to wash said air filter, means including a solenoid valve for delivering water to said water spray header, an electrical circuit including a power source and the solenoid of said solenoid valve and a switch, said switch formed to complete said circuit for the operation of said solenoid when said switch is closed, means operable to close said switch, said last mentioned means operating responsive to a certain predetermined resistance of said air filter to air passing therethrough, said solenoid valve formed to disable said thermostatically operated means when said solenoid valve is operated.

7. In an air conditioning system, thermostatically operated means for controlling the operation of said air conditioning system, an air filter, water spray means operating responsive to the reception of water thereto for washing said air filter, means including a solenoid valve for delivering water to said water spray means responsive to the operation of the solenoid of said solenoid valve, means associated with said thermostatically operated means and said solenoid valve for disabling said thermostatically operated means responsive to the operation of said solenoid valve, an electrical circuit including a power source and the solenoid of said solenoid valve and a switch, said switch formed to complete said circuit for the operation of said solenoid when said switch is closed, means operable to close said switch, said last mentioned means operating responsive to a certain predetermined resistance of said air filter to air passage therethrough, and timing means comprising a bleeder valve mounted in cooperation with said solenoid valve and operating responsive to the operation of said solenoid valve to maintain said solenoid valve operated for a predetermined length of time.

8. In an air conditioning system, thermostatically operated means for controlling the operation of said air conditioning system, a substantially air-tight cabinet, an intake duct and an exhaust opening provided through the walls of said cabinet, an air filter mounted within said intake duct, means within said cabinet operable to draw air into said intake duct through said air filter and to expel said air from said exhaust opening at certain air pressures in said cabinet, water spray means operating responsive to the reception of water thereto for washing said air filter, means including a solenoid valve for delivering water to said water spray means responsive to the operation of the solenoid of said solenoid valve, an electrical circuit including a power source and the solenoid of said solenoid valve and a switch, said switch formed to complete said circuit for the operation of said solenoid when said switch is closed, means operable to close said switch, said last-mentioned means operating responsive to an air pressure within said cabinet some amount below said certain air pressures, and means associated with said solenoid valve and said thermostatically operated means for disabling said thermostatically operated means responsive to the operation of said solenoid valve and for enabling said thermostatically operated means responsive to the restoration of said solenoid valve.

9. In an air conditioning system, thermostatically operated means for controlling the operation of said air-conditioning system, a substantially air-tight cabinet, an intake duct and an exhaust opening provided through the walls of said cabinet, an air filter mounted within said intake duct, means within said cabinet operable to draw air into said intake duct through said air filter and to expel said air from said exhaust opening at certain air pressures in said cabinet, a water spray header positioned within said intake duct on the air inlet side of said air filter, said water spray header operating responsive to the reception of water thereto for washing said air filter, means including a solenoid valve for delivering water to said water spray header responsive to the operation of the solenoid of said solenoid valve, means associated with said solenoid valve and said thermostatically operated means operating responsive to the operation of said solenoid valve for disabling said thermostatically operated means and for enabling said thermostatically operated means responsive to the restoration of said solenoid valve, an electrical circuit including a power source and the solenoid of said solenoid valve and a switch, said switch formed to complete said circuit for the operation of said solenoid when said switch is closed, means operable to initially close said switch, said last-mentioned means operating responsive to an air pressure within said cabinet some amount below said certain air pressures, and timing means comprising an adjustable bleeder valve associated with said solenoid valve and operating responsive to the operation of said solenoid valve for maintaining said solenoid valve operated for an adjustable length of time.

10. In an air conditioning system, a substantially airtight cabinet, a service opening and a door pivotally mounted thereover mounted through one wall of said cabinet for service access within said cabinet, an intake duct and an exhaust duct provided through other walls of said cabinet, an air filter mounted within said intake duct, means within said cabinet operable to draw air into said intake duct through said air filter and expel air from said exhaust duct at certain amounts of air pressure within said cabinet, water spray means operable to wash said air filter, means operating responsive to an air pressure within said cabinets, an amount below said certain air pressures for operating said water spray means, said last mentioned means comprising an opening formed through said door, a second door pivotally mounted over said opening in said door, a bellows mounted about the marginal edges of said door in a sealed relationship thereto, said bellows further mounted in a sealed relationship about the edges of said opening in said door, biasing means for biasing said second door to the open position, whereby said second door is moved toward the closed position amounts proportional to said certain amounts of air pressure in said cabinet, and means mounted within said cabinet to one wall thereof and to said second door and operating responsive to the closing of said second door to a position representing some amount of air pressure within said cabinet below said certain air pressures for operating said water spray means.

References Cited in the file of this patent
UNITED STATES PATENTS

| | | |
|---|---|---|
| 1,947,447 | Brassert et al. | Feb. 20, 1934 |
| 1,949,540 | Hammond | Mar. 6, 1934 |
| 2,218,453 | Mickle | Oct. 15, 1940 |
| 2,633,206 | Bruckner | Mar. 31, 1953 |
| 2,633,929 | Farr | Apr. 7, 1953 |